Feb. 13, 1962     C. KAPLAN     3,020,796

KALEIDOSCOPIC DEVICE

Filed April 17, 1959

INVENTOR:
Cudek Kaplan
BY
AGENT.

3,020,796
KALEIDOSCOPIC DEVICE
Cudek Kaplan, 561 W. 163rd St., New York 32, N.Y.
Filed Apr. 17, 1959, Ser. No. 807,191
2 Claims. (Cl. 88—15)

My present invention relates to a kaleidoscopic device adapted to display a variety of patterns of different configurations and color combinations to an observer.

Kaleidoscopic devices are widely used as as toys designed to amuse youngsters by the diversity of the shapes adapted to be successively formed by a slight agitation or rotation of the viewing tube. This tube usually contains, in addition to the necessary internal reflecting surfaces, a filling of freely movable pebbles, crystals or the like which in their random groupings nevertheless give rise to regular polygonal images, a fact which rarely fails to amaze the unsophisticated observer and also serves to familiarize him with certain geometrical concepts.

After an initial period of enjoyment, however, the average user soon tires of the instrument as he discovers a recurrence of the same basic patterns. Having no control over the distribution of the image-forming particles, he finds himself moreover in a passive role which does not long sustain his interest.

It is an object of my invention to provide an improved kaleidoscopic device in which the user can actively control the formation of the patterns and wherein the number and variety of such patterns is virtually unlimited.

A more specific object of my invention is to provide a device of the character described which is useful not only as a toy but also as an aid to the designer of ornaments and industrial patterns.

A further object of my invention is the provision of a device for the production of three-dimensional patterns in contradistinction to the flat images obtained from conventional kaleidoscopes.

With the above and other objects in view, I provide a kaleidoscopic device in which a turntable preferably of translucent material (e.g. a ground-glass plate) is manually rotatable about a vertical stem which also serves as a support for a viewing tube eccentrically mounted above the turntable. Sufficient clearance exists between the lower end of the viewing tube and the turntable for the passage of small objects which, when placed on an exposed portion of the turntable, can be rotated into the field of view of the tube. Advantageously, the viewing tube is of generally frusto-pyramidal configuration and has its wider end adjacent the turntable to afford a large display area, at the same time causing its slanting mirrors to reflect the image of the deposited objects in a three-dimensional pattern to give an illusion of depth. A source of light may be provided directly underneath the viewing tube for translumination of the turntable and the objects positioned thereon.

The invention will be described in greater detail with reference to the accompanying drawing in which.

Figure 1:
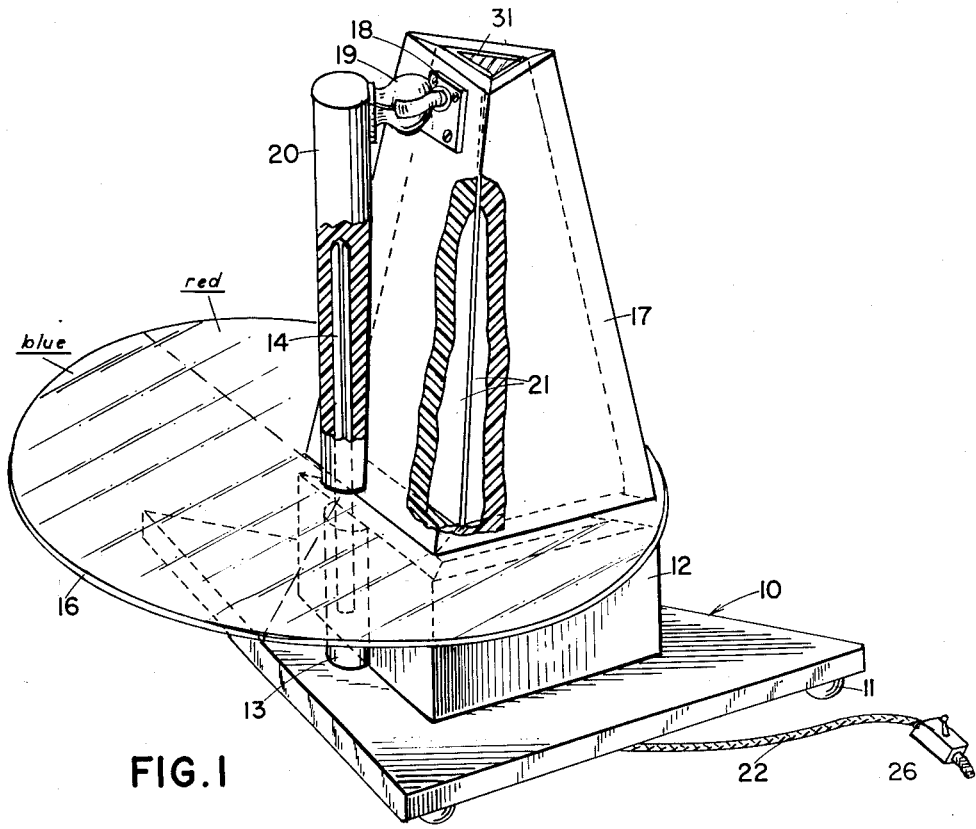
FIG. 1 is a perspective view of a kaleidoscopic device (parts broken away) according to my invention.

The kaleidoscopic device shown in the drawing comprises a triangular base 10 supporting an upwardly open housing 12 of similar configuration. A tubular projection 13 on the housing supports a vertical stem 14 which passes through a central aperture in a turntable 16 and is longitudinally split in its upper portion to exert resilient pressure upon a plastic rod 20 having a bore to receive this stem. The bore of rod 20 is slightly shorter than the portion of stem 14 projecting above turntable 16 so that this rod is spacedly held above the turntable, as is a viewing tube 17 which is mounted on the upper end of rod 20 with freedom of limited relative adjustment. In the specific embodiment illustrated, the tube 17 carries near its top a mounting plate 18 with a ball received in a pair of jaws 19 on rod 20 to form a universal joint.

Figure 2:
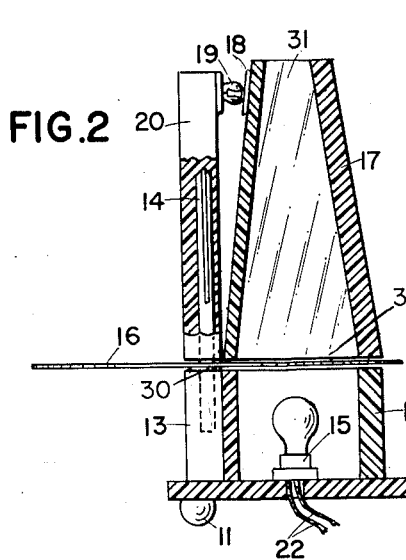
FIG. 2 is a sectional elevational view of the device shown in FIG. 1.

The viewing tube 17 is of frusto-pyramidal configuration and has a triangular cross section similar to the outlines of housing 12 and base 10. Tube 17 is lined internally with three slanting mirrors 21 which define a relatively narrow viewing aperture 31 at the top and a relatively wide field aperture 32 at the bottom. The turntable 16, which may be a ground-glass disk, rests on a spacer 30 enabling its unhindered rotation above housing 12 within which there is disposed a lamp 15. In the embodiment of FIGS. 1 and 2 the lamp 15 is connected to a cable 22 which passes between the short legs 11 of base 10 to a plug (not shown) connectable to the usual utility mains and which also includes a switch 26 for turning the lamp on and off.

Figure 3:
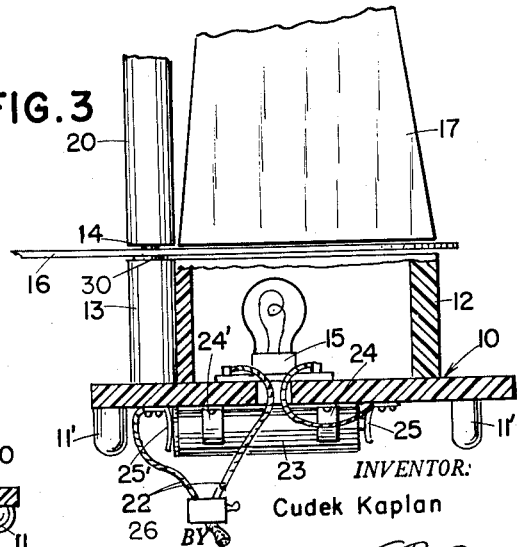
FIG. 3 is a fragmentary elevational view, partly in section, of a modified form of this device.

In the modification of FIG. 3, the base 10 is supported on legs 11' of greater length enabling a battery or dry cell 23 to be held underneath the base by spring clips 24, 24'. Terminal springs 25, 25' engage the poles of the battery and are connected to wires 22' which complete the energizing circuit for lamp 15 through switch 26.

In order to provide a variety of translumination effects, the disk 16 may be subdivided into several sectors of different colors as indicated in FIG. 1.

In operation, various objects such as tinsel, spangles, threads, shreds of paper and other articles, low enough to pass the clearance between tube 17 and turntable 16, are placed on an exposed portion of the latter which thereupon is rotated until such objects enter the field of view of tube 17. The turntable may be arrested in any position in which an interesting pattern is formed and may thereafter be rotated further to vary the pattern. Other variations with the same array of objects are possible by slightly moving the tube 17 in a radial direction about its pivot 18, 19. If the objects are allowed to project from below tube 17, they may also be adjusted by hand to change the pattern previously formed. I have found that a single thread, for example, may be used in this manner to provide a diversity of ornamental configurations and that two or more threads of different colors, if juxtaposed in various combinations, can furnish a large number of original patterns of interest to textile designers.

By raising the tube 17 and its mounting rod 20 on the supporting stem 14 I am also able to increase the clearance between the tube and the turntable 16 sufficiently to place larger objects (e.g. crystals) on the portion of the turntable operatively aligned with tube 17.

My invention is, of course, not limited to the specific embodiments described and illustrated but may be realized in various modifications and adaptations without departing from the spirit and scope of the appended claims.

I claim:

1. A kaleidoscopic device comprising a substantially vertical stem, a turntable of translucent material rotatable about said stem, said stem projecting above said turntable, an internally reflecting viewing tube of frusto-pyramidal configuration and triangular cross-section substantially vertically supported on said stem and positioned with clearance above an eccentric portion of said turntable, said tube opening with its wider end onto said turntable, a base for said stem underneath said turntable, a housing on said base open toward said turntable, and an electric lamp within said housing substantially in line with the tube axis.

2. A kaleidoscopic device comprising a substantially vertical stem, a turntable of translucent material rotatable about said stem, said stem projecting above said turntable, an internally reflecting viewing tube of frusto-pyramidal configuration and polygonal cross-section substantially vertically supported on said stem and positioned with clearance above an eccentric portion of said turntable, said tube opening with its wider end onto said turntable, a base for said stem underneath said turntable, a housing on said base open toward said turntable, and a source of light within said housing substantially in line with the tube axis.

References Cited in the file of this patent

UNITED STATES PATENTS

| | | |
|---|---|---|
| 151,005 | Bush | May 19, 1874 |
| 407,937 | Lovibond | July 30, 1889 |
| 2,493,238 | Eddy | Jan. 3, 1950 |

FOREIGN PATENTS

| | | |
|---|---|---|
| 192,687 | Germany | Dec. 6, 1907 |
| 337,380 | Germany | May 31, 1921 |
| 408,743 | Italy | Jan. 9, 1945 |
| 413,361 | Italy | Apr. 15, 1946 |
| 796,102 | Great Britain | June 4, 1958 |